M. G. FREEMAN.
IRON FENCE.
No. 7,775. Reissued July 3, 1877.
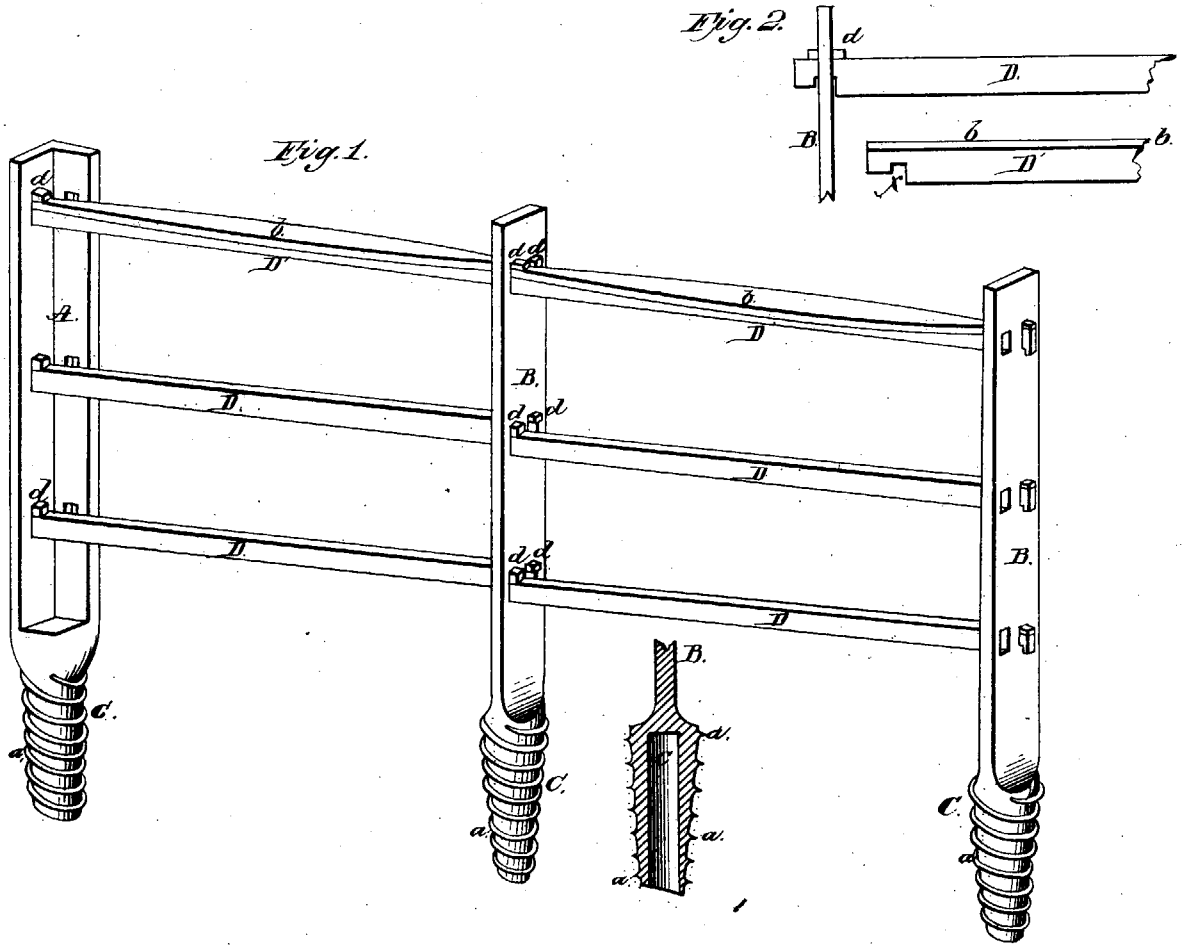
Attest:
W. R. Goodsell
R. G. Lyle
Inventor:
Moody G. Freeman
H. PETERS, PHOTO-LITHOGRAPHER, WASHINGTON, D. C.

UNITED STATES PATENT OFFICE.

MOODY G. FREEMAN, OF BLOOMINGTON, ILLINOIS.

IMPROVEMENT IN IRON FENCES.

Specification forming part of Letters Patent No. 163,761, dated May 25, 1875; Reissue No. 7,775, dated July 3, 1877; application filed May 17, 1877.

*To all whom it may concern:*

Be it known that I, MOODY G. FREEMAN, of Bloomington, in the county of McLean, and in the State of Illinois, have invented certain new and useful Improvements in Iron Fence; and do hereby declare that the following is a full, clear, and exact description thereof, reference being had to the accompanying drawings, and to the letters of reference marked thereon, making a part of this specification.

The nature of my invention consists in the construction and arrangement of an iron fence, as will be hereinafter more fully set forth.

In the annexed drawings, Figure 1 is a perspective view of my fence, and Fig. 2 shows detailed parts thereof.

A represents a corner-post, and B B intermediate posts, of my fence. The lower ends C of all the posts are made hollow, in cylindrical form, with exterior screw-threads formed thereon. The posts are forced into the ground by means of the screw or grooves.

The corner-post A is made with a right angle, as shown, while the intermediate posts B are made flat, and stand at right angles with the line of the fence.

The posts, as well as the rails or bars, may be made either of cast-iron or wrought-iron, though the rails may be made of band-iron.

The corner-post A is provided with two sets of mortises to receive the rails, one for each line of fence. The intermediate posts B have, also, two sets of mortises for the rails, so that respective rails in the panels shall correspond in height.

D D represent the rails, any number of which may be used. These are made flat, and set edgewise, the top rail D, however, being provided with a projecting flange, *b*, on both sides at the top, so as to stiffen the same and make it strong, and the fence more firm.

The rails have at each end a notch, *x*, on the under side, which drops into the mortises in the posts when the rails are fastened in the posts by means of keys *d*, which are forced into the mortises on the top of the rails.

All the rails except the top ones may have a notch in the middle, which middle notch may rest in the mortise; or, in other words, the rails may pass through one post and the ends fastened in posts on each side thereof. In this manner the rails may be made to break joints, so to speak, thus making the fence stronger.

It will be seen that each post has a double series of notches, so that any one of the rails can be detached without disturbing the one adjacent thereto. The posts are cast tapering where inserted in the ground, with the lower end open to permit the escape of any water which may gather in the hollow through holes in the metal or otherwise.

The advantage of such shaped base is that, in forcing the post into the ground, an amount of soil equal to the size of the base of the post is displaced, and pressed into the walls of the post-hole, making such walls surrounding the post-base more dense and solid, and giving the post a firmer setting.

The exterior of the post-base can be painted, or the exterior and interior coated with any composition impervious to water to prevent rusting, in which case there will practically be no end to the durability of the post.

I make no claim to the rails or bars, nor to any particular form of the upper portion of the post; but

I claim—

As a new article of manufacture, a fence-post, having a metallic hollow tapering base, such base having closed sides and exterior screw-threads, substantially as and for the purpose described.

MOODY G. FREEMAN.

Witnesses:

W. H. HOOFSTETLER,

R. J. LIPE.